P. GALLEHUE.
VEHICLE SIGNAL.
APPLICATION FILED AUG. 6, 1920.
1,411,719.
Patented Apr. 4, 1922.
2 SHEETS—SHEET 1.
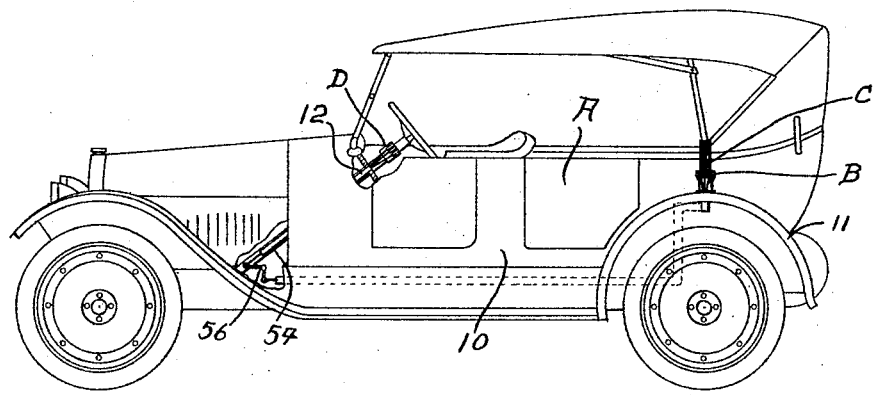
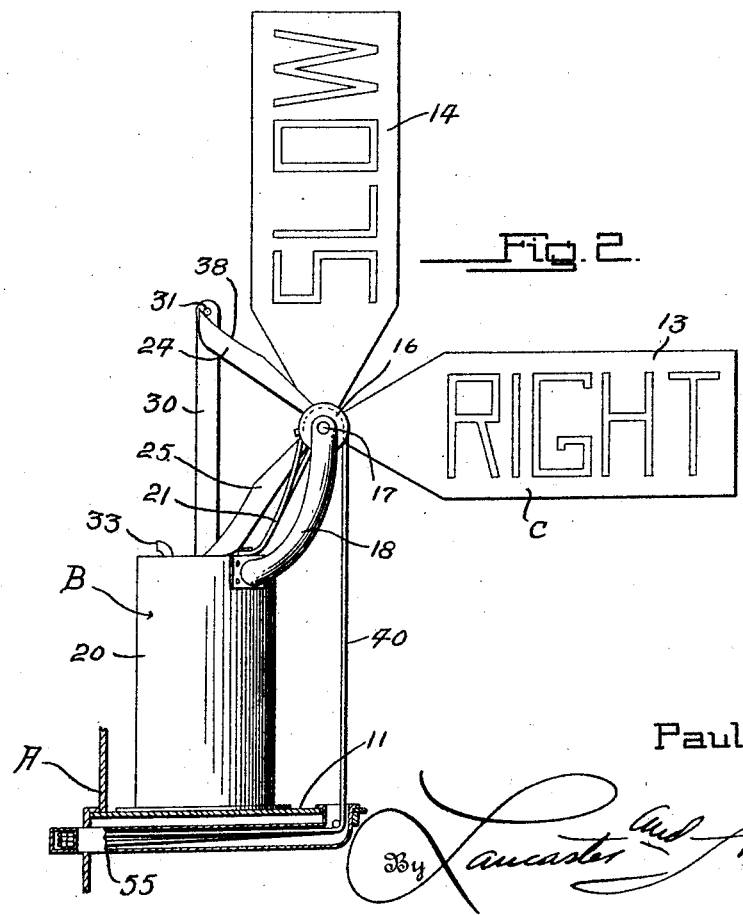
Inventor
Paul Gallehue.

P. GALLEHUE.
VEHICLE SIGNAL.
APPLICATION FILED AUG. 6, 1920.
1,411,719.
Patented Apr. 4, 1922.
2 SHEETS—SHEET 2.
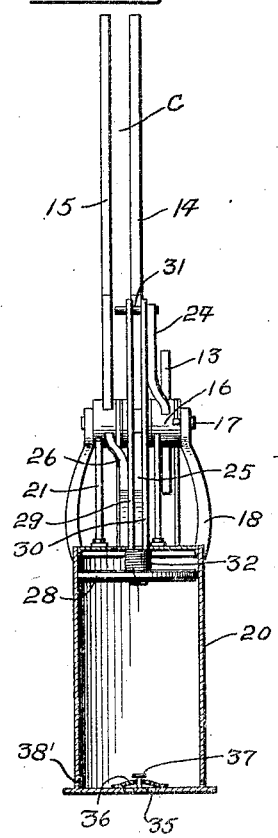
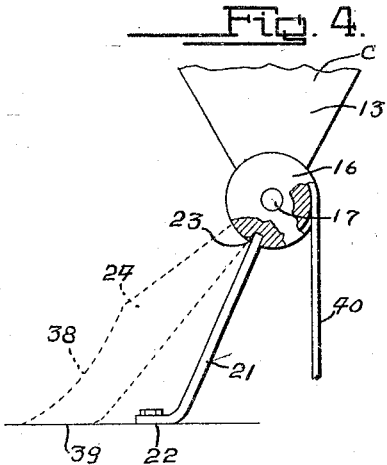
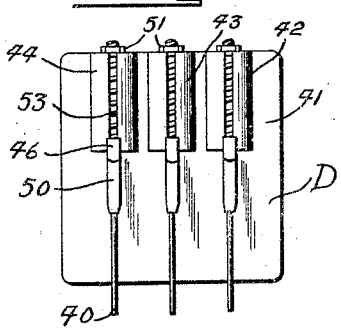
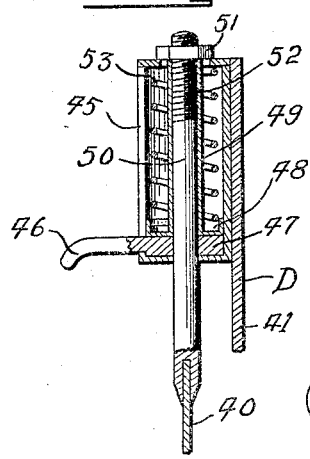
Inventor
Paul Gallehue.
By Lancaster and Allwine
Attorneys

UNITED STATES PATENT OFFICE.

PAUL GALLEHUE, OF SPRINGFIELD, OHIO.

VEHICLE SIGNAL.

1,411,719.	Specification of Letters Patent.	Patented Apr. 4, 1922.

Application filed August 6, 1920. Serial No. 401,634.

*To all whom it may concern:*

Be it known that I, PAUL GALLEHUE, a citizen of the United States, residing at Springfield, in the county of Clark and State of Ohio, have invented certain new and useful Improvements in Vehicle Signals, of which the following is a specification.

This invention relates to signals and the primary object of the invention is to provide an improved means for indicating the direction in which a vehicle is about to turn, without making it necessary for the driver to signal with his arms.

Another object of the invention is to provide an improved vehicle direction indicator which can be readily operated by the driver and which is so positioned, that persons in the front and rear of the machine can readily determine exactly what course the vehicle is going to pursue.

A further object of the invention is to provide an improved direction indicator for motor vehicles embodying a plurality of semaphore arms, having suitable directions printed or stamped thereon and an improved means for operating the arms, from the driver's seat.

Another object of the invention is to provide an improved means for automatically and slowly returning the arms to their normal position after actuation, so as to eliminate the necessity of returning the same by hand and so that persons can obtain a good view of the signal before the same is returned to its normal position.

A further object of the invention is to provide an improved means for automatically holding and locking the arms in their inoperative position, so as to prevent accidental actuation thereof.

A still further object of the invention is to provide an improved direction indicator for motor vehicles of the above character, which is durable and efficient in use, one that is simple and easy to manufacture, and one which can be placed upon the market and incorporated with a vehicle at a minimum cost.

With these and other objects in view the invention consists in the novel construction, arrangement and formation of parts, as will be hereinafter more specifically described, claimed and illustrated in the accompanying drawings, forming a part of this specification, in which drawings, Figure 1 is a side elevation, partly in section of a motor vehicle, showing the improved direction indicator incorporated therein.

Fig. 2 is an enlarged front elevation of the signaling portion of the direction indicator, showing the same attached to a vehicle fender, the fender and associate parts being shown in section.

Fig. 3 is a side elevation of the signaling portion of the direction indicator, showing the automatic returning means for the semaphore arms in section.

Fig. 4 is a fragmentary sectional view of one of the semaphore arms, showing the means employed for holding the same in its raised inoperative position.

Fig. 5 is an elevation of the actuating portion for the semaphore arms of the direction indicator.

Fig. 6 is an enlarged vertical section through the same.

Referring to the drawings in detail, wherein similar reference characters designate corresponding parts throughout the several views, the letter A indicates a motor vehicle and B the improved direction indicator therefor.

The motor vehicle A may be of the usual or any preferred type or make, and as shown includes the body 10, having the rear fenders 11, and the steering post 12.

The improved direction indicator B includes the signaling portion C and the actuating portion D.

The signaling portion C of the improved direction indicator may be placed at any convenient part of the motor vehicle that may be desired, such as at the rear end thereof where the usual license plate and bracket go, or on the fender. As shown the indicating or signaling portion C is secured to the rear fender 11, so that a view may be obtained thereof from the front and rear of the vehicle.

The improved signaling portion includes three semaphore blades or arms 13, 14 and 15, which are constructed substantially the same and it is preferred that the arm 13 have the word "Right" printed or stamped thereon, and the arm 14 the word "Slow" thereon and the arm 15 the word "Left" written thereon. However any suitable words or symbols, such as arrows may be arranged on the blades, which will indicate the direction of movements of the vehicle.

Each of the arms 13, 14 and 15 includes a hub 16, which is rotatably mounted upon a fixed shaft 17, the terminals of which are supported by arms 18, carried by the upper end of a cylinder 20. The arms 18 are secured adjacent to the opposite sides of the cylinder at the upper end thereof, by means of bolts, rivets or the like and as shown the supporting arms or brackets are to one side of the diametric center of the cylinder, and extend outwardly, so that the semaphore arms will be positioned at one side thereof.

The semaphore arms are adapted to lie in a vertical non-signaling position and to normally hold the same in this position, resilient leaf springs 21 are provided for each one of the hubs 16 thereof. These springs 21 are provided with right angularly extending attaching feet 22 which are bolted or otherwise secured to the upper surface of the cylinder 20. The periphery of each one of the hubs 16 is provided with a notch 23 in which the free end of the spring is adapted to seat and it can be seen that when the same is seated in the notch, that accidental movement of the semaphore arms will be prevented. The spring and the notch are so arranged in relation to each other that when a sharp pull is exerted thereon, that the same will proceed to rotate on the shaft 17 and the spring will be permitted to ride from out of the notch 23. Each one of the semaphore arms 13, 14 and 15 have secured to the hubs 16 thereof, the arms 24, 25 and 26. The arms 24 and 26 are offset inwardly, as clearly shown in Figure 3 of the drawings, while the center arm 25 is arranged in parallel alignment with its blade 14.

The cylinder 20 has slidably mounted therein a piston 28, which may be of any preferred construction and this piston supports a centrally disposed piston rod, which includes a pair of spaced arms 29 and 30. These arms 29 and 30 extend through the upper end of the cylinder 20 and are connected by a cross pin 31 which extends outwardly from the opposite sides of the arms. An expansion coil spring 32 is arranged around the spaced parallel arms 29 and 30 and engages the inner surface of the upper wall of the cylinder and the upper surface of the piston 28 and normally holds the piston in a lowered position in the cylinder. The upper end of the cylinder is provided with an air escape opening 33, so as to permit the easy movement of the piston in the cylinder, when the same is raised. The lower wall of the cylinder is provided with relatively large inlet openings 35 which are normally closed by a check valve 36 which is held in position by headed pin 37 which also acts as a stop to limit the downward movement of the piston. The opposite walls of the cylinder are also provided with relatively fine air escape openings 38', the purpose of which, will be hereinafter more fully described.

The arms 24, 25 and 26 normally rest below the pin 31 carried by the arms 29 and 30 of the piston rod and they have their upper surfaces curved arcuately as at 38, for engagement therewith. The lower edge of these arms adjacent to their outer ends, are flattened, as at 39, so as to form a foot for engaging the upper surface of the cylinder 20 and this serves for also holding the arms in a raised inoperative position.

When any one of the arms 13, 14 and 15 is swung to a lowered operative signaling position, its arm engages the pin 31 and thus raises the piston 28 in its cylinder. As the piston raises in its cylinder, air will be sucked in through the openings 35 and the check valve 36 will be raised. After the arm has been moved to a signaling position and pressure is released therefrom, it can be seen that the coil spring 32 will tend to move the piston back to its normal position and the signaling arm therewith. However the return movement will be relatively slow owing to the air cushion formed in the cylinder and as the air slowly escapes through relatively fine openings 38', the arm will be slowly returned to its inoperative position. The central arm 25 carried by the semaphore arm 14 is arranged intermediate the arms 29 and 30 which forms the piston rod and it can be seen that when the piston rod is operated by any one of the semaphore arms, that the pin 31 carried thereby will not operate or interfere with the other semaphore arms. The periphery of each one of the hubs 16 of the semaphore arms 13, 14 and 15 have attached thereto cables 40 which extend to the actuating portion D of the direction indicator, which will be hereinafter more specifically described. The cylinder 20 is adapted to be secured in place in any preferred manner, such as by rivets, brackets or the like.

The actuating portion D of the direction indicator includes a base plate 41 and this base plate may be secured at any preferred part on the motor vehicle, where the same can be readily actuated by the driver thereof. As shown in Figure 1 of the drawings the plate 41 is mounted upon steering column 12, which it is believed is the most convenient point for the same. The base plate 41 carries the three substantially cylindrical casings 42, 43 and 44 and these casings correspond to semaphore arms 13, 14 and 15. The front faces of each one of the casings 42, 43 and 44 has a slot 45 formed therein to receive the actuating handles 46 for the semaphore arms. The operating means for all of the semaphore arms are substantially the same, and only one operating means for one of the arms will be described. The operating means consists of a flat disc 47, which is slidably mounted in the casing and carries the operating handle 46. The upper surface of the disc 47 is engaged by a cup 48 which carries a sleeve 49 and this sleeve 49 is slidably mounted upon a rod 50 which extends through its casing. The lower end of the rod 50 has secured thereto one of the operating cables 40 and the slack in any one of the operating cables 40 may be taken up, by adjusting the nut 51, which is threaded on the upper threaded portion 52 of the rod 50, which extend outwardly through the upper end of the casing. The cup 48 receives an expansion coil spring 53 and the upper end of this spring engages the inner surface of the upper wall of the casing and normally tends to hold the cup and the disc 47 in a lowered position. As shown the upper end of the sleeve 49 engages the lower surface of the nut 51 and when the disc 47 is raised by the operating handle 46, the rod 50 will be raised therewith and consequently the cable 40 pulled. It can be seen that when the rod 50 is raised or lowered by means of the nut 51 to take up the slack in the cables, that the tension of the springs 53 will not be adjusted.

The cables 40 extend through suitable housings 54 and 55 carried by the steering column of the vehicle and suitable pulleys may be interposed in the housings, to guide the movement thereof so that the cables can be easily actuated. As shown bell cranks 56 are interposed in the cables adjacent to the lower end of the steering column, so as to permit the more convenient operation of cables.

In operation of the improved signaling apparatus, when the driver is going to turn right, left, or to slow down, one of the handles 46 is pushed upwardly, which will move the rod 50 upwardly and consequently pull on the cable 40. The cable 40 will in turn pull on one of the hubs 16 of one of the semaphore arms 13, 14 and 15 and draw the same down to a signaling position. As soon as the pressure is released on the operating handle 46, the rod 50 and its cable will be returned to a normal position by means of the expansion spring 53. When these portions are returned to their normal position, the coil spring 32 will also act to return the piston and the semaphore arm to their normal position as heretobefore described.

From the foregoing description, it can be seen that an extremely simple and efficient device has been provided by means of which the driver of a vehicle may readily indicate to persons in the front and rear of his machine which direction his vehicle is going to take.

Changes in details may be made without departing from the spirit or scope of this invention, but what I claim as new is:

1. In a direction signal for vehicles, a plurality of semaphore arms, means for normally holding the semaphore arms in an inoperative signaling position, mechanical means for independently moving any one of the arms to an operative signaling position, and means actuated by any one of the arms for returning the arms to their normal non-signaling position.

2. In a direction indicator for motor vehicles, a plurality of swinging semaphore arms, means for normally holding the arms in an inoperative signaling position, a cylinder, a retarding piston slidably mounted in said cylinder, and legs carried by said semaphore arms arranged to engage and actuate said piston when the same are moved to their operative signaling position in order to raise said piston to retard the return movement of the arms.

3. In a direction signal for vehicles, a plurality of swinging semaphore arms, means for normally holding the semaphore arms in a raised non-signaling position, means for moving any one of the arms independently of the others to a signaling position, a cylinder, a retarding piston slidably mounted in the cylinder, and means carried by each one of the semaphore arms for engagement with the piston for raising the same in the cylinder, when moved to a signaling position in order to retard the return movement of the arms to a non-signaling position.

4. A direction indicator for vehicles comprising a plurality of swinging semaphore arms having suitable directions written on the opposite faces thereof, means for moving any one of the arms to a signaling position, and means operated by the semaphore arms during the movement thereof to a signaling position for automatically returning the arms to a non-signaling position.

5. In a direction indicator for vehicles, a cylinder, a retarding piston slidably mounted in the cylinder, a piston rod carried by the piston, a shaft carried by the cylinder arranged above the upper surface of the same, a plurality of arms rotatably carried by the shaft, means independently operating any one of the arms, and means carried by the arms for engagement with said piston rod for retarding return movement of the arms.

6. In a direction indicator for motor vehicles, a cylinder, a retarding piston slidably mounted in said cylinder, air escape formed in the upper end of said cylinder, valve controlled air ports arranged in the lower end of the cylinder, a piston rod secured to said piston, a shaft carried by the cylinder and positioned above the upper surface of the same, a plurality of rotatable semaphore arms mounted on said shaft, means for moving the arms to a signaling position, means for normally holding the arms in a non-signaling position, a cross pin carried by said piston rod, and legs formed on said semaphore arms arranged to engage said cross pin for raising said retarding piston in the cylinder when the arms have been moved to a signaling position in order to retard return movement of the arms to a non-signaling position.

7. In a direction indicator for motor vehicles, a plurality of swinging semaphore arms, an actuating device for each one of the semaphore arms including a casing, a rod slidably mounted in the casing, flexible means connecting the rods with the semaphore arms, spring means to normally hold the rods in a lowered position, and means for raising the rods against tension of said spring means.

8. In a direction indicator a plurality of swinging semaphore arms, an actuating device for each one of the arms including a casing, a rod slidably mounted in the casing, a disc mounted in said casing about said rod, a cup arranged in said casing a spring engaging said cup and the inner surface of the upper wall of said casing, means for adjusting the rod in relation to said disc and cup, an operating handle formed on said disc, and connecting cables for said semaphore arms and rods.

9. In a direction indicator for motor vehicles, a plurality of swinging semaphore arms, resilient means for normally holding the arms in a non-signaling position, an actuating means for each one of the arms including a casing, a rod slidably mounted in the casing, a disc slidably mounted on the rod arranged within the casing, a cup slidably mounted on said rod and arranged within the casing, a sleeve formed on said cup and slidably mounted on said rod arranged to extend out of said casing, and a nut adjustably mounted on said rod arranged to engage the under surface of the casing, the sleeve being adapted to engage said nut, and an expansion coil spring coiled around said sleeve and arranged to engage the inner surface of the upper wall of said casing and said cup, and means connecting the rods to the semaphore arms.

PAUL GALLEHUE.